US 10,300,588 B2

(12) United States Patent
Pauba

(10) Patent No.: US 10,300,588 B2
(45) Date of Patent: May 28, 2019

(54) METHOD OF SETTING A DROP-IN ANCHOR

(71) Applicant: Andrew S. Pauba, Omaha, NE (US)

(72) Inventor: Andrew S. Pauba, Omaha, NE (US)

(*) Notice: Subject to any disclaimer, the term of this patent is extended or adjusted under 35 U.S.C. 154(b) by 197 days.

(21) Appl. No.: 15/364,518

(22) Filed: Nov. 30, 2016

(65) Prior Publication Data
US 2018/0147707 A1 May 31, 2018

(51) Int. Cl.
B21D 39/00 (2006.01)
B25B 31/00 (2006.01)
B25B 27/06 (2006.01)
F16B 13/08 (2006.01)
F16B 19/10 (2006.01)
F16B 15/04 (2006.01)
B25B 27/00 (2006.01)
B25B 19/00 (2006.01)
B25B 27/02 (2006.01)
B25B 27/04 (2006.01)

(52) U.S. Cl.
CPC .............. B25B 31/00 (2013.01); B21D 39/00 (2013.01); B25B 27/00 (2013.01); B25B 27/02 (2013.01); B25B 27/06 (2013.01); F16B 19/1081 (2013.01); B25B 19/00 (2013.01); B25B 27/04 (2013.01); F16B 13/0858 (2013.01); F16B 15/04 (2013.01); Y10T 29/5393 (2015.01); Y10T 29/53843 (2015.01); Y10T 29/53913 (2015.01); Y10T 29/53943 (2015.01)

(58) Field of Classification Search
CPC ......... B25B 19/00; B25B 27/00; B25B 27/02; B25B 27/04; B25B 27/06; B25B 31/00; F16B 13/0858; F16B 15/04; F16B 19/1081; Y10T 29/5393; Y10T 29/53913; Y10T 29/53943; Y10T 29/53843

See application file for complete search history.

(56) References Cited

U.S. PATENT DOCUMENTS 4,637,539 A * 1/1987 Turcott ................... B25B 27/30
173/128
5,030,043 A * 7/1991 Fischer ................. B25D 17/005
279/145

(Continued)

FOREIGN PATENT DOCUMENTS

EP 763665 A1 3/1997
EP 1357302 A1 10/2003

(Continued)

Primary Examiner — Jermie E Cozart
(74) Attorney, Agent, or Firm — Luke Charles Holst; McGrath North Mullin & Kratz, PC LLO

(57) ABSTRACT

The present invention relates in general to the field of securing structural members to masonry, and more specifically, to a drop-in anchor setting tool and method of use. The drop-in anchor setting tool includes a hands-free safety feature that allows the drop-in anchor and setting tool to remain embedded in the masonry during installation. In particular, the drop-in anchor setting tool includes a threaded portion configured to screw together the drop-in anchor and the drop-in anchor setting tool during installation. A purpose of invention is to provide a drop-in anchor setting tool and method of use that minimizes risk of injury to the operator during installation, is easy to use, and cost-effective to manufacture.

10 Claims, 3 Drawing Sheets

(56) References Cited

U.S. PATENT DOCUMENTS

| | | | |
|---|---|---|---|
| 5,329,802 A * | 7/1994 | Nunez | B21D 1/06 |
| | | | 72/457 |
| 5,733,083 A | 3/1998 | Heminger | |
| 5,807,051 A | 9/1998 | Leminger | |
| 6,666,636 B2 | 12/2003 | Warmolts et al. | |
| 8,398,346 B2 | 3/2013 | Bland et al. | |
| 8,439,614 B2 | 5/2013 | Bland et al. | |
| 8,465,239 B2 | 6/2013 | Armiento et al. | |
| 8,540,469 B2 | 9/2013 | Armiento et al. | |
| 8,714,897 B2 | 5/2014 | Bland et al. | |
| 8,915,686 B2 | 12/2014 | Martin | |
| 8,992,147 B2 | 3/2015 | Armiento et al. | |
| 2008/0173141 A1* | 7/2008 | Wallek | B25B 31/00 |
| | | | 81/177.1 |
| 2009/0180839 A1* | 7/2009 | Kardas | B25B 23/141 |
| | | | 405/259.1 |
| 2009/0293258 A1 | 12/2009 | Cousineau | |
| 2009/0302088 A1* | 12/2009 | Santamarina | B25B 31/00 |
| | | | 227/139 |
| 2010/0299844 A1 | 12/2010 | Armiento et al. | |
| 2011/0089218 A1* | 4/2011 | Santamarina | B23B 51/08 |
| | | | 227/139 |
| 2013/0161038 A1 | 6/2013 | Prunean | |
| 2015/0290722 A1 | 10/2015 | Foser | |

FOREIGN PATENT DOCUMENTS

| | | |
|---|---|---|
| EP | 1357302 B1 | 5/2005 |
| EP | 2395247 A1 | 12/2011 |
| EP | 2557321 A2 | 2/2013 |
| WO | 2013173713 A1 | 11/2013 |

\* cited by examiner

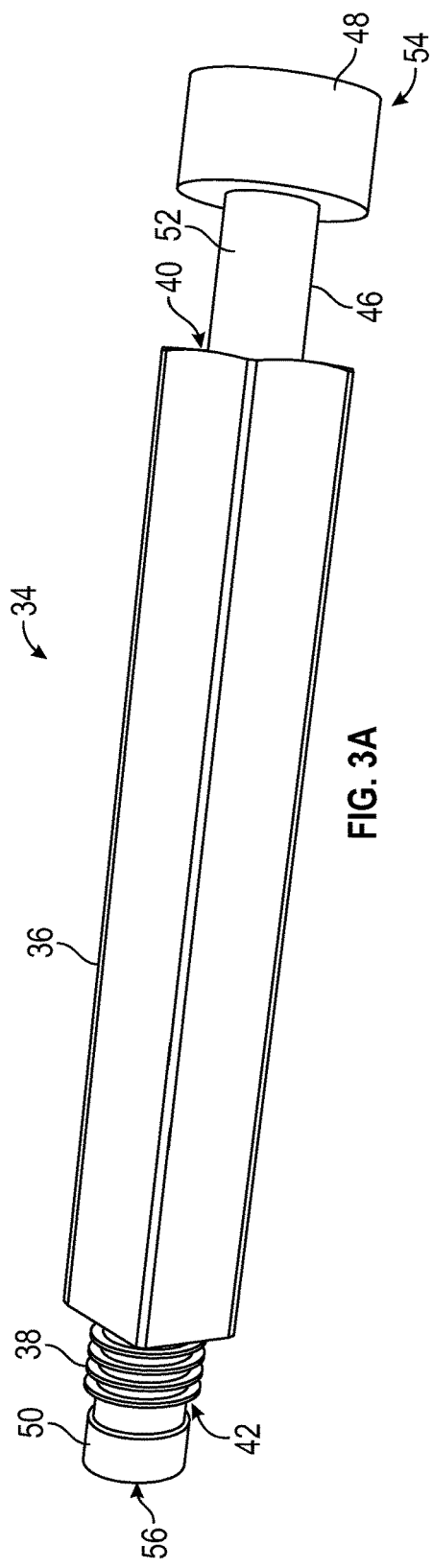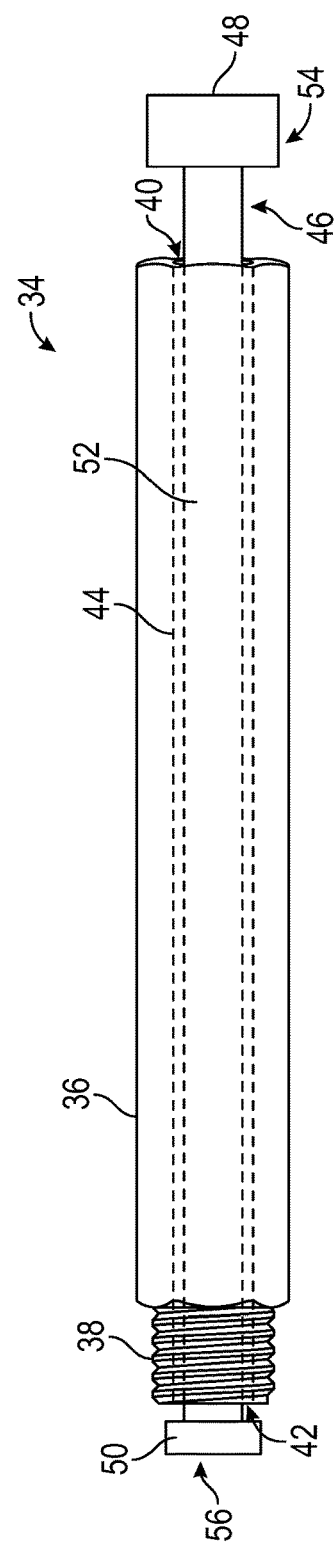

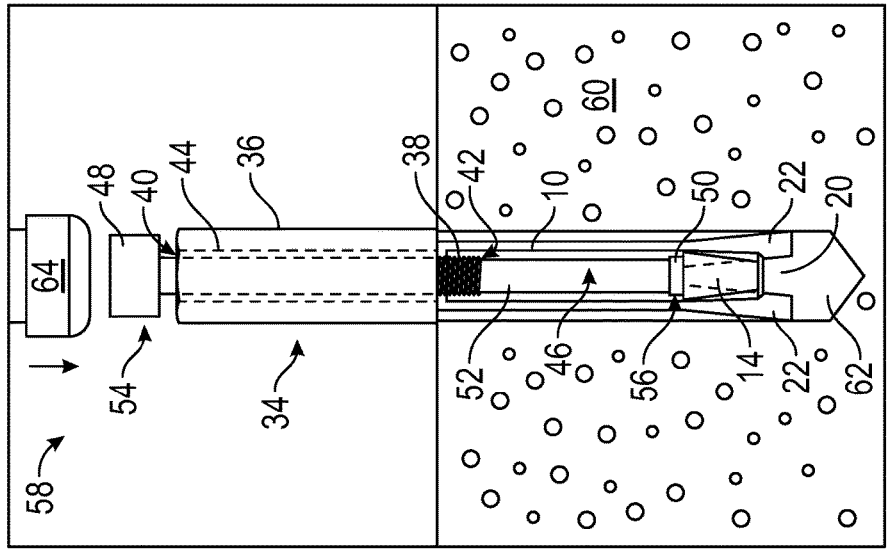
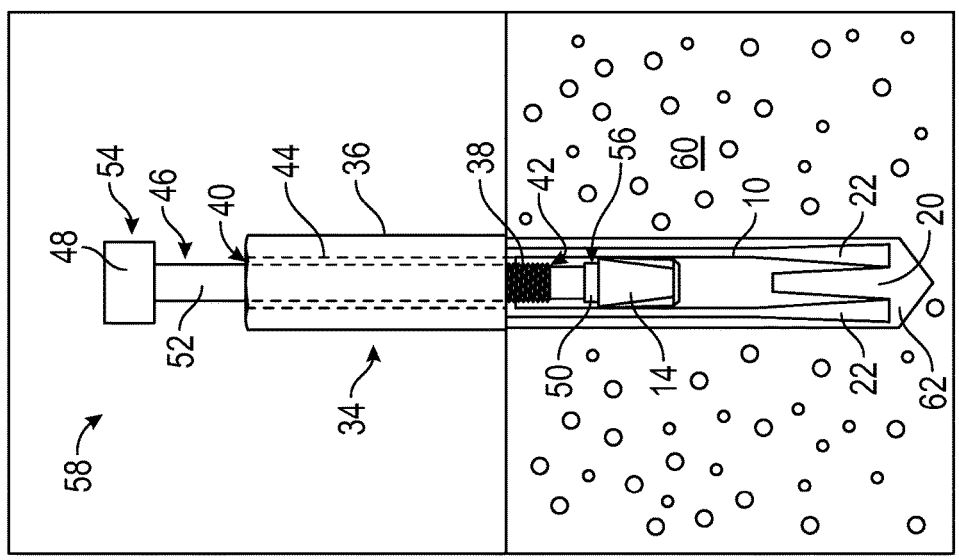

METHOD OF SETTING A DROP-IN ANCHOR

FIELD OF THE INVENTION

The present invention relates in general to the field of securing structural members to masonry, and more specifically, to a drop-in anchor setting tool and method of use. A purpose of the invention is to provide a drop-in anchor setting tool with a hands-free safety feature that allows the drop-in anchor and setting tool to remain embedded in the masonry during installation. An additional purpose of invention is to provide a drop-in anchor setting tool and method of use that is easy to operate, cost-effective to manufacture and convenient to store.

BACKGROUND OF THE INVENTION

Drop-in anchors, also known as wedge anchors or expansion anchors, are used in the construction industry to secure fixtures (e.g., lights, electrical wiring, etc.) into solid base materials (e.g., concrete, concrete blocks, bricks, stone and/or other types of masonry). The setting of the drop-in anchor typically requires a hammer and a setting tool to fix the drop-in anchor in the solid base material. Problems abound, however, when drop-in anchors are installed overhead for use in flush-mount applications. For example, an operator must hold overhead the drop-in anchor, setting tool and hammer—all at the same time—all while setting the drop-in anchor into the solid base material. This awkward process requires two hands and becomes exhausting to the operator overtime as multiple drop-in anchors are set. Moreover, safety becomes an issue as the drop-in setting tool may be accidentally dropped—directly onto the operator's head—while setting the drop-in anchor. Thus, a desire remains to provide a drop-in anchor setting tool and method of use that mitigates exhaustion and risk of injury for an operator associated with traditional setting tools. A desire also remains to provide a drop-in anchor setting tool and method of use that may be conveniently set by an operator using one hand.

BRIEF SUMMARY OF THE INVENTION

Therefore, it is a principal object, feature, and/or advantage of the present invention to overcome the aforementioned deficiencies in the art and provide a drop-in anchor setting tool and method of use that minimizes safety concerns and risk of injury for the operator.

Another object, feature, and/or advantage of the present invention is to provide a drop-in anchor setting tool and method of use that is sturdy and allows an operator to apply significant force when struck with a hammer.

Yet another object, feature, and/or advantage of the present invention is to provide a drop-in anchor setting tool and method of use that maximizes efficiency, is easy to operate and convenient to store.

A further object, feature, and/or advantage of the present invention is to provide a drop-in anchor setting tool and method of use that may be used overhead, adjacent or beneath an operator.

A still further object, feature, and/or advantage of the present invention is to provide a drop-in anchor setting tool and method of use that may be used for setting drop-in anchors in all manner of solid base materials.

Another object, feature, and/or advantage of the present invention is to provide a drop-in anchor setting tool and method of use that is convenient to clean and maintain.

Yet another object, feature, and/or advantage of the present invention is to provide a drop-in anchor setting tool and method of use that may be used by operators of varying heights and sizes.

A further object, feature, and/or advantage of the present invention is to provide a drop-in anchor setting tool and method of use that is simple and cheap to manufacture.

A still further object, feature, and/or advantage of the present invention is to provide a drop-in anchor setting tool and method of use that is inexpensive, value-priced and thus affordable for the everyday consumer.

Another object, feature, and/or advantage of the present invention is to provide a drop-in anchor setting tool and method of use that may be used commercially in the construction industry.

Yet another object, feature, and/or advantage of the present invention is to provide a drop-in anchor setting tool and method of use that may be used with one hand by an operator while setting the anchor.

These and/or other objects, features, and/or advantages of the present invention will be apparent to those skilled in the art. The present invention is not to be limited to or by these objects, features, and advantages. No single aspect need provide each and every object, feature, or advantage.

According to one aspect of the present invention, a drop-in anchor setting tool is provided. The drop-in anchor setting tool comprises a tubular body and a threaded bolt. The threaded bolt is sized and configured to be screwed into internal threads of a drop-in anchor. Thus, the drop-in anchor setting tool may be removably attached to the drop-in anchor. A central bore also traverses through the tubular body and the threaded bolt, wherein a pin may slide inside the central bore. The pin includes a plunger with a striking head at one end and a driving head at an opposite end. The pin is configured such that when the striking head is struck with a striking tool (e.g., hammer or other heavy object) the plunger slides inside the central bore and the driving head pushes an expander plug inside the drop-in anchor. Driving the expander plug further inside the drop-in anchor sets the drop-in anchor in a pre-drilled hole in solid base material.

According to another aspect of the present invention a method of setting a drop-in anchor using a drop-in anchor setting tool is provided. The method includes providing a standard drop-in anchor and a drop-in anchor setting tool of the present invention. The method next comprises drilling a hole into solid base material using means standard in the industry. The drop-in anchor may be removably attached to the drop-in anchor setting tool by screwing the threaded bolt of the drop-in anchor setting tool into the internal threads of the drop-in anchor. Once the drop-in anchor is removably attached to the drop-in anchor setting tool, the drop-in anchor may be placed inside the pre-drilled hole of the solid base material. The method may next comprise striking a striking head of the drop-in anchor setting tool with a striking tool until the drop-in anchor is fully set in the pre-drilled hole of the solid base material. The drop-in anchor setting tool may subsequently be detached from the drop-in anchor by unscrewing the threaded bolt from the internal threads of the drop-in anchor. A fixture may then be attached to the set drop-in anchor using a standard fixture support member.

Different aspects may meet different objects of the invention. Other objectives and advantages of this invention will be more apparent in the following detailed description taken in conjunction with the figures. The present invention is not to be limited by or to these objects or aspects.

DESCRIPTION OF FIGURES

FIGS. 1-4 represent examples of drop-in anchors, traditional drop-in anchor setting tools, and drop-in anchor setting tools of the present invention, including a method of setting a drop-in anchor using the drop-in anchor setting tool of the present invention.

FIG. 2 is an isometric side view of a traditional setting tool for the drop-in anchor of FIG. 1.

FIG. 3A is an isometric side view of a drop-in anchor setting tool of the present invention.

FIG. 3B is a cross-sectional side view of the drop-in anchor setting tool of FIG. 3A.

FIG. 4A is a partially cut-away, diagrammatic view showing a method of setting a drop-in anchor using the setting tool of the present invention, wherein the drop-in anchor is in a first contracted state.

FIG. 4B is a partially cut-away, diagrammatic view showing a method of setting a drop-in anchor using the setting tool of the present invention, wherein the drop-in anchor is in a second expanded state.

DETAILED DESCRIPTION OF THE INVENTION

Figure 1A:
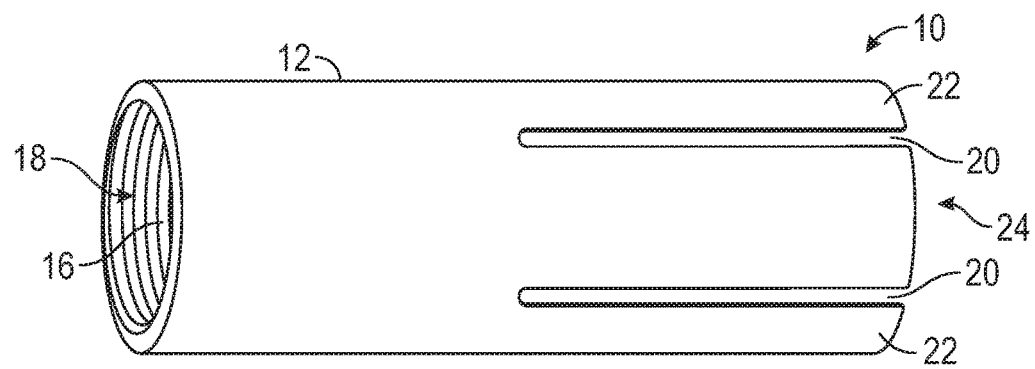
FIG. 1A is an isometric, side view of a standard drop-in anchor.
Figure 1B:
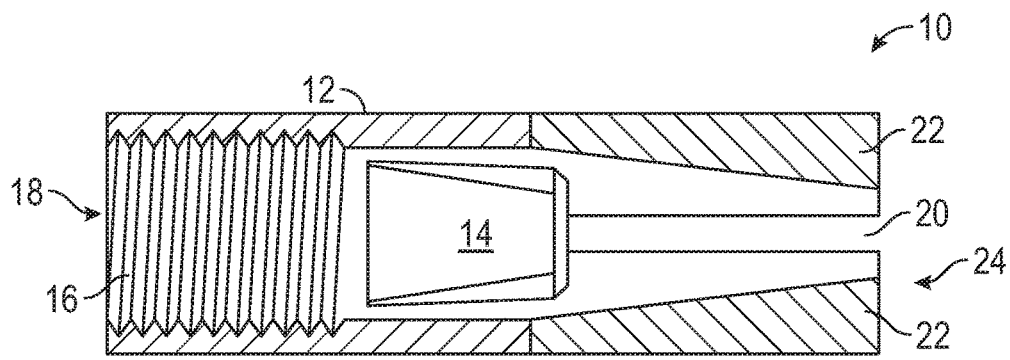
FIG. 1B is an isometric, cross-sectional view of the standard drop-in anchor of FIG. 1A.

FIGS. 1A and 1B illustrate an isometric side view and a cross-sectional side view, respectively, of a standard drop-in anchor (10) currently used in the construction industry. Components of the drop-in anchor (10) include an outer tubular expansion shield (12) and an inner expander plug (14). The tubular expansion shield (12) may include internal threads (16) in an open first end (18) and a plurality of equally spaced expansion slots (20) and expansion regions (22) at an opposite second end (24). Drop-in anchors (10) are usually comprised of zinc plated carbon and/or stainless steel. The drop-in anchor (10) is designed to be placed into pre-drilled holes in solid base materials (e.g., concrete, concrete blocks, bricks, stone and/or other types of masonry).

Figure 2:
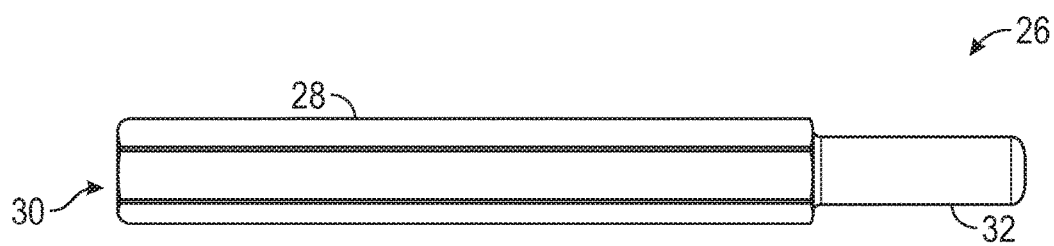

FIG. 2 illustrates a traditional setting tool (26) accessory for the drop-in anchor (10). Setting tools (26) currently used in the construction industry comprise a tubular body (28), a striking end (30) located at one end of the tubular body (28) and a neck (32) located at an opposite end of the tubular body (28). The tubular body (28) and neck (32) of the setting tool (26) are integral and formed from a single piece of metal. The striking end (30) is configured to be struck with a striking tool (e.g., hammer or other heavy object). As shown in FIG. 2, the neck (32) comprises a diameter narrower than a diameter of the tubular body (28).

In application, the drop-in anchor (10) may be inserted into the pre-drilled hole set into the solid base material. The neck (32) of the setting tool (26) may then be inserted into the open first end (18) of the drop-in anchor (10), wherein the neck (32) abuts the adjacent expander plug (14). Using the striking tool, an operator may hit the striking end (30) of the setting tool (26) wherein the neck (32) drives the expander plug (14) further into the drop-in anchor (10). Driving the expander plug (14) further into the drop-in anchor (10) causes the expansion regions (22) to flare radially outwards. As the expansion regions (22) flare radially outwards and press against the walls of the pre-drilled hole, the drop-in anchor (10) becomes wedged inside the pre-drilled hole. The setting tool (26) may subsequently be removed from the set drop-in anchor (10) and a fixture attached using a standard threaded bolt screwed tightly into the internal threads (16) of the drop-in anchor (10).

FIGS. 3A and 3B illustrate one aspect of the present invention, a drop-in anchor setting tool (34). In particular, FIG. 3A illustrates an isometric side view and FIG. 3B a cross-sectional side view the drop-in anchor setting tool (34) of the present invention. The drop-in anchor setting tool (34) of the present invention may be configured to fit drop-in anchors (10) of all sizes, including, as a non-limiting example, a ¼ in., ⅜ in., ½ in., ⅝ in. or ¾ in. drop-in anchor. An overall length of the drop-in anchor setting tool (34) may range between 1-14 inches, wherein an outside diameter may range between 0.25-3.5 inches. The drop-in anchor setting tool (34) of the present invention may also be comprised of zinc plated carbon, steel, stainless steel, aluminum, plastics, combinations thereof and/or other materials standardly used in the industry.

Shown in FIGS. 3A and 3B, the drop-in anchor setting tool (34) may comprise a tubular body (36) and an adjacent threaded bolt (38). The tubular body (36) and the adjacent threaded bolt (38) may be formed integrally together or formed separately and permanently affixed together thereafter. The threaded bolt (38) may be configured to be screwed into the internal threads (16) of the open first end (18) of the drop-in anchor (10), therefore removably attaching the drop-in anchor setting tool (34) to the drop-in anchor (10). The tubular body (36) may comprise a hexagonal tubular shape configured to allow an operator to rotate the setting tool (34) with a wrench if needed. However, it is contemplated that other tubular shapes may also be utilized by the present invention (e.g., square, rectangular, triangular, pentagonal, etc.). The tubular body (36) and adjacent threaded bolt (38) may further comprise a first open end (40) and an opposite second open end (42). A central bore (42) traverses through the tubular body (36) and adjacent threaded bolt (38), wherein the central bore (42) may extend from the first open end (40) to the opposite second open end (42).

Further shown in FIGS. 3A and 3B, the setting tool (34) of the present invention may comprise a pin (46). An overall length of the pin (46) may range between 1-17 inches. The pin (46) may comprise a striking head (48), a driving head (50) and a plunger (52). In particular, the striking head (48) may be located at a first end (54) of the pin (46) and the driving head (50) located at an opposite second end (56) of the pin (46). The striking head (48) and the driving head (50) may be connected by the plunger (52). The striking head (48), the driving head (50) and the plunger (52) may be formed integrally together or formed separately and permanently affixed together thereafter.

The plunger (52) may fit snugly inside the central bore (44) traversing through the tubular body (36) and adjacent threaded bolt (38), wherein the plunger (52) may be configured to slide inside the central bore (44). The plunger (52) may be configured to slide inside the central bore (44) between 0.25-4 inches. The striking head (48) may be located towards the first open end (40), wherein the striking head (48) may be configured to be struck with a striking tool (e.g., hammer or other heavy object). The plunger (52) may be of a longer length than a combined length of the tubular body (36) and adjacent threaded bolt (38) to allow the plunger (52) to slide inside the central bore (44). A diameter of the striking head (48) and a diameter of the driving head (50) may be larger than a diameter of the sliding plunger (52) and a diameter of the central bore (44) to prevent the pin (46) from sliding out of the central bore (44). The driving head (50) may be located towards the second open end (42), wherein the driving head (50) may be configured to reside adjacent the expander plug (14) while the drop-in anchor setting tool (34) is removably attached to the drop-in anchor (10). The driving head (50) may be further configured to push the expander plug (14) further into the drop-in anchor (10) as the striking head (48) is struck with a striking tool and the plunger (52) consequently slides inside the central bore (44). As explained previously, driving the expander plug (14) further inside the drop-in anchor (10) causes the expansion regions (22) to flare radially outwards and set the drop-in anchor (10) in the pre-drilled hole of the solid base material. Notably the drop-in anchor setting tool (34) is configured such that the striking head (48) abuts the tubular body (36) when the drop-in anchor (10) becomes fully set in the pre-drilled hole of the solid base material.

FIGS. 4A and 4B illustrate another aspect of the present invention, a method (58) of setting a drop-in anchor (10) into solid base materials (60) (e.g., concrete, concrete blocks, bricks, stone and/or other types of masonry). The method (58) comprises providing the drop-in anchor (10) and the drop-in anchor setting tool (34) as illustrated in FIGS. 1-4 and detailed above. The method also comprises drilling a hole (62) into the solid base material (60) using means standard in the industry. The hole (62) may be optionally cleaned afterwards to remove debris and residue by using a wire brush and/or a vacuum.

Shown in FIG. 4A, the drop-in anchor (10) may be removably attached to the drop-in anchor setting tool (34) by screwing the threaded bolt (38) into the internal threads (16) of the open first end (18) of the drop-in anchor (10). An operator may use a wrench and the corresponding hexagonal tubular shape of the tubular body (36) to assist in rotating the setting tool (34) while screwing the threaded bolt (38) into the internal threads (16). As explained previously, the driving head (50) may reside adjacent the expander plug (14) while the drop-in anchor setting tool (34) is removably attached to the drop-in anchor (10). Once the drop-in anchor (10) is removably attached to the drop-in anchor setting tool (34), the drop-in anchor (10) may be placed inside hole (62) of the solid base material (60).

Shown in FIG. 4B, an operator may grasp the tubular body (36) in a first hand to maintain the drop-in anchor setting tool (34) in an optimal position and use the second hand to strike the striking head (48) of the pin (46) with a striking tool (64). As the striking head (48) is struck with the striking tool (64) and the plunger (52) consequently slides inside the central bore (44), the driving head (50) pushes the expander plug (14) further into the drop-in anchor (10). As explained previously, driving the expander plug (14) further inside the drop-in anchor (10) causes the expansion regions (22) to flare radially outwards and set the drop-in anchor (10) in the hole (62) of the solid base material.

After initially setting the drop-in anchor (10) in the hole (62), the operator may let go of the tubular body (36) with the first hand because the drop-in anchor setting tool (34) is removably attached to the drop-in anchor (10), thus, holding it in position in the solid base material (60). This is particularly beneficial when drop-in anchors are installed overhead for use in flush-mount applications, as the method no longer requires the operator to use two hands. Moreover, the drop-in anchor setting tool (34) inherently includes a hands-free safety feature for the operator. For example, the operator may step away if necessary during installation because the drop-in anchor setting tool (34) is removably attached to the drop-in anchor (10) embedded in the solid base material (60). For at least these reasons, the method (58) of the present invention therefore reduces exhaustion for the operator and mitigates risk of injury that the drop-in setting tool (34) may be accidentally dropped directly onto the operator's head while setting the drop-in anchor (10).

Further shown in FIG. 4B, the method (58) of the present invention further comprises the operator continuing to strike the striking head (48) with the striking tool (64) until the drop-in anchor (10) is fully set in the hole (62) of the solid base material (60). Notably the drop-in anchor setting tool (34) is configured such that the striking head (48) abuts the tubular body (36) when the drop-in anchor (10) becomes fully set in the hole (62) of the solid base material (60). The drop-in anchor setting tool (34) may then be detached from the drop-in anchor (10) by unscrewing the threaded bolt (38) from the internal threads (16) of the drop-in anchor (10). An operator may use the wrench and the corresponding hexagonal tubular shape of the tubular body (36) to assist in rotating the setting tool (34) to unscrew the threaded bolt (38) from the internal threads (16) of the drop-in anchor (10). Subsequently, a fixture (not shown) may be attached to the set drop-in anchor (10) using a standard threaded bolt screwed tightly into the internal threads (16) of the set drop-in anchor (10).

The drop-in anchor setting tool (34) of the present invention and method (58) of setting a drop-in anchor (10) are universally applicable to drop-in anchors (10) of all shapes and sizes, makes, models, and manufacturers. Furthermore, while intended for solid base materials (60), the drop-in anchor setting tool (34) of the present invention may be used for other materials wherein drop-in anchors (10) may also be utilized. Although the invention has been described and illustrated with respect to preferred aspects thereof, it is not to be so limited since changes and modifications may be made therein which are within the full intended scope of the invention.

What is claimed is:
1. A method of setting a drop-in anchor, comprising:
   providing a drop-in anchor;
   providing a drop-in anchor setting tool, the drop-in anchor setting tool comprising:
   a) a tubular body;
   b) the tubular body comprising an open first end and an opposite second end;
   c) a threaded bolt adjacent the second end of the tubular body;
   d) a central bore traversing through the tubular body and the threaded bolt;
   e) a pin fitted inside the central bore; and
   f) the threaded bolt configured to screw inside internal threads of the drop-in anchor;
   removably attaching the drop-in anchor setting tool to the drop-in anchor;
   drilling a hole into solid base material;
   placing the drop-in anchor into the hole;
   striking the pin to set the drop-in anchor into the solid base material; and
   detaching the drop-in anchor setting tool from the set drop-in anchor.
2. The method of claim 1, wherein removably attaching the drop-in anchor setting tool to the drop-in anchor comprises screwing the threaded bolt into the internal threads of the drop-in anchor.

3. The method of claim 1, wherein the pin is configured to slide inside the central bore.

4. The method of claim 3, the pin comprising a striking head at a first end of the pin.

5. The method of claim 4, the pin comprising a driving head at an opposite second end of the pin;
   wherein the driving head is configured to push an expander plug inside the drop-in anchor.

6. The method of claim 5, wherein striking the pin to set the drop-in anchor into the solid base material comprises striking the striking head with a hammer.

7. The method of claim 6, wherein upon striking the striking head of the pin with a hammer the pin slides inside the central bore and the driving head pushes the expander plug inside the drop-in anchor to set the drop-in anchor into the solid base material.

8. The method of claim 7, wherein detaching the drop-in anchor setting tool from the set drop-in anchor comprises unscrewing the threaded bolt from the internal threads of the drop-in anchor.

9. The method of claim 1, wherein the drop-in anchor setting tool comprises carbon and stainless steel.

10. The method of claim 1, wherein the tubular body comprises a hexagonal shape configured to fit a wrench to assist in attaching or detaching the threaded bolt from the internal threads of the drop-in anchor.

* * * * *